Figure 1:
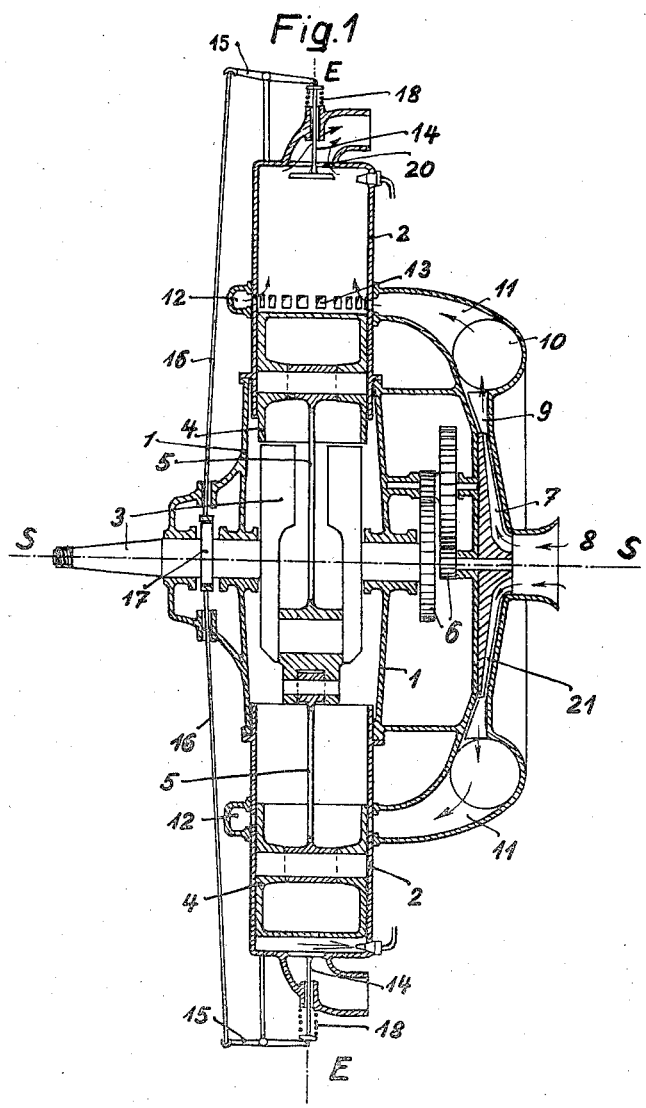

July 27, 1937.　　　A. PODRABSKY　　　2,088,215
MULTICYLINDER TWO-STROKE-CYCLE DIESEL ENGINE
Filed July 25, 1932　　　2 Sheets-Sheet 2

Antonin Podrabsky
INVENTOR
BY
ATTORNEY.

Patented July 27, 1937

2,088,215

UNITED STATES PATENT OFFICE 2,088,215

MULTICYLINDER TWO-STROKE-CYCLE DIESEL ENGINE

Antonin Podrabsky, Brunn, Czechoslovakia, assignor to Firm Ceskoslovenska Zbrojovka Akciova spolecnost v Brne, Brunn, Czechoslovakia Application July 25, 1932, Serial No. 624,529
In Czechoslovakia August 8, 1931

1 Claim. (Cl. 123—65)

This invention relates to new and useful improvements in multi-cylinder Diesel engines with direct fuel injection, and its object is the combination of a plurality of cylinders controlled in a predetermined manner with a turbo-compressor which supplies the cylinders with air for the charging and scavening.

It has been the practice to provide such Diesel engine cylinders with slots distributed throughout their circumference for admitting scavenging air and with exhaust valves provided in the cylinder head. These slots forming part of inlet ports for the scavening air are connected with the outside atmosphere through an annular channel.

It has also been suggested to employ a simple pump or blower acting as an air-compressor in combination with radially arranged cylinders of an internal combustion engine with spark plug ignition. Sometimes in such internal combustion engines instead of a spark plug an incandescent cylinder head or the like may be used for igniting the compressed fuel. The use of a blower does not, however, insure the same advantages as a turbo-compressor, the connection of which with the annular channel of the exhaust ports, offers a minimum of resistance, whereby said connection can be properly diminished to suit the characteristics of the turbo-compressor.

Attempts have also been made to associate two-stroke radial internal combustion engines with a turbo-compressor in which the exhaust valves were provided in the cylinder heads. However, in such structures the air delivered by the turbo-compressor did not flow over the shortest path direct from the cylinder to the exhaust valve, but was delivered from a single position of the turbo-compressor into an annular conduit having branches leading to the individual cylinders. Thus resistance to the passage of air was considerable with a resulting diminution of engine efficiency.

Four-stroke combustion engines were also known which consisted of a plurality of explosion engines and a single turbo-compressor. The exhaust valves were provided on the ends of the individual explosion cylinders. In such structures the cylinders were never arranged radially but in series, whereby the air paths from the compressor to the cylinders were of different lengths which again unfavorably affected the engine's efficiency.

In accordance with the present invention these objections are obviated by combining the radially arranged cylinders of a Diesel engine having inlet ports distributed throughout their circumferences and an exhaust valve in each cylinder head with a centrally arranged turbo-compressor. Engines so constructed may be operated at higher speeds without attaining the predetermined maximum scavenger pressure than was heretofore possible. Furthermore, the arrangement provided permits a reduction in the weight of the engine which is of particular importance in the use of such engines in aircraft.

The air delivered by the turbo-compressor passes through the shortest path directly through the cylinder into the exhaust valve and enhances the efficiency of the engine.

The arrangement permits also operation of all the cylinders in the simplest possible manner, the cams of only alternate exhaust valves being displaced with respect to the cam shaft, or the cams being displaced only at a certain angle with respect to the cam shaft. This simple valve gear is again possible only on account of the above described combination of the parts in which the exhaust valves may be adjusted by means of a common and easily adjustable cam.

With all previously known engines of this kind high rotational speeds (important for obtaining satisfactorily high specific power output especially with cylinders of larger capacity) were only obtainable by employing excessively high inlet and exhaust ports, even where engines with reversed scavenging or U-shaped cylinders or with opposed pistons were concerned. If however, normal ports were selected, scavening air at a high pressure had to be used in order to secure the required effect. Higher pressure was only obtained by using a turbo-compressor of higher peripheral speed which severely stressed the rotor and thus reduced reliability. On the other hand, where higher ports are used the effective stroke is shorter and consequently the charge volume of the cylinder is smaller; thus the mean effective pressure is lower which results in the engine's having a heavier weight per horse power.

The employment of a turbo-compressor with known types of engines, owing to its characteristic, has the result that the rate of supply at a given revolution speed is dependent not solely on the dimensions and the construction of the turbo-compressor, but also within wide limits on the size of the outlet openings of the turbo-compressor or on the resistance to flow of the air passing from the turbo-compressor to the individual working cylinders. The inlet and exhaust ports of the working cylinders are to be regarded as the outlet openings of the turbo-compressor.

On these grounds it is necessary to regulate accurately the outlet openings of the compressor in the form of the inlet and exhaust ports of the working cylinders. Formerly this regulation could only be obtained by changing fundamental dimensions of the valve-gear parts.

All these disadvantages are avoided by the present combination of the multi-cylinder aggregate with the turbo-compressor.

The subject of the invention is represented in a constructional example shown in the accompanying drawings.

Fig. 1 represents the complete arrangement in section, and

Figure 2:
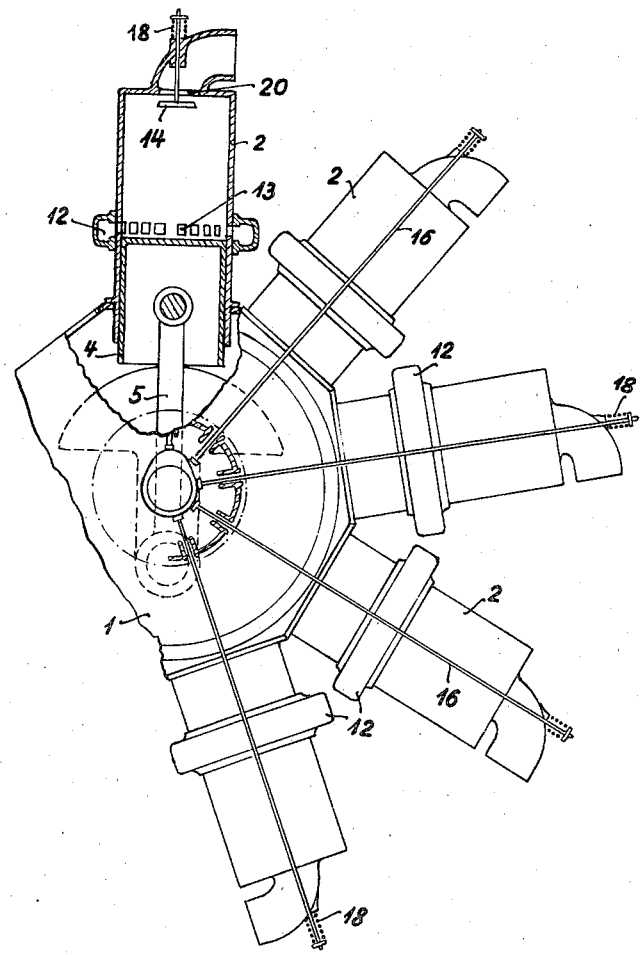

Fig. 2 a view of part of the arrangement according to Fig. 1, one cylinder being shown in longitudinal section.

1 is a motor casing which carries cylinders 2 on its periphery and a rotatably mounted crank shaft 3. In the working cylinders 2 operate pistons 4 whose force is transmitted to the crank shaft 3 by connecting rods 5 in known manner.

A turbo-compressor is denoted by 21 which is driven by means of a spur wheel 6 from the crank shaft 3. The rotor 7 of the turbo-compressor is mounted in the present constructional example concentrically with the multi-cylinder aggregate formed by the working cylinders. 8 denotes the inlet opening for the inflowing air. 9 is a diffuser, 10 a receiver from which an induction pipe 11 leads to each cylinder opening into an annular passage 12 of each cylinder. 13 are inlet ports in the working cylinder which are situated either on the whole or on a large part of the circumference of the cylinder and open into the annular passage 12. 20 are the exhaust ports of the working cylinders, 14 the exhaust valves. In the cylinder head of each working cylinder there may be provided either only one or several exhaust valves if the use of only one large valve with a high lift results in too unfavourable working conditions. By 17 is denoted a cam keyed to the crank shaft 3 which opens the exhaust valves 14 by means of push rods 16 and rockers 15. The valves 14 are closed by springs 13.

The main feature of the invention consists in the combination of several working cylinders 2, controlled in the manner described above, with a turbo-compressor 21, so that each cylinder is provided with inlet ports 13 controlled by the piston 4 for the scavenging and charging air and with mechanically-operated exhaust valves 14. By this combination of the working cylinders controlled in the described manner with the turbo-compressor, the resistances are substantially reduced which the scavenging and charging air meets in its passage from the turbo-compressor through the working cylinders, so that it is able to escape freely with a normal height of inlet ports 13. Consequently the engine operates without reduction of the effective piston stroke and of the cylinder charge volume. Further, with the improved engine, in spite of the normal height of the ports, a relatively low charging pressure for the scavenging air and a relatively low peripheral velocity of the turbo compressor are permissible.

In the constructional example considered, the working cylinders 2 are, according to a further feature of the invention, disposed star fashion. This arrangement offers the advantage of ample air cooling of each working cylinder which is not easily secured with double-piston engines (U-cylinder, or opposed pistons).

In the present constructional example, the valve gear 17, 16, 15, 18, 14 and the turbo-compressor 21 are placed on opposite sides of the common central plane E—E of all the working cylinders.

In the particularly suitable constructional example shown in Figs. 1 and 2, the set of cylinders and the turbo-compressor have a common axis of symmetry S—S. With this constructional arrangement according to the invention, the set of cylinders is so arranged with reference to the turbo-compressor that the air is led from the turbo-compressor to each working cylinder by the shortest practicable path and with the least possible resistance to flow.

Each combination of a multi-cylinder aggregate with a turbo-compressor comes within the scope of the invention wherein a set of several working cylinders not placed one behind another is mounted concentrically to an axis lying outside the cylinders, and the turbo-compressor and the multi-cylinder aggregate, considered as a whole, possess geometrical axes which lie parallel to one another or which coincide.

As is evident from Figs. 1 and 2, in the constructional example considered, the air is led directly without frictional loss through a simple connection from the receiver 11 of the turbo-compressor to each one of the cylinders. Therefore by-passing of burnt gases at the beginning of the charging period in an adjacent cylinder and consequently poor scavenging, are effectively prevented.

The previously known combination of working cylinders arranged in line with a turbo-compressor has important disadvantages in comparison with the present arrangement. With a previously known arrangement, the passages which conduct the air from the turbo-compressor to each of the working cylinders are divided, which causes a difference in the resistance to flow to the various individual working cylinders and unequal supply of scavenging and charging air to the individual working cylinders. Usually the turbo-compressor is connected to working cylinders arranged in line by a single manifold which is provided with branches to the working cylinders. In this case, by-passing of burnt gases is easily possible at the beginning of the induction period in adjacent cylinders. In accordance with the present invention, by means of this arrangement an element common to all the valves, i. e., the cam provided on main shaft 3, controls the exhaust valve 14. If it is desired to change the exhaust opening of valve 14, the cam 17 is removed from the shaft 3 and replaced by a cam having a different contour, whereby the size as well as the time of opening of the valve opening may be changed as required.

The manner of operation of the combination of a multi-cylinder aggregate with a turbo-compressor shown in Figs. 1 and 2, is as follows:—

The air enters the inlet opening 8 and flows through the rotor 7 and the diffuser 9 into the ring-shaped receiver 10 of the turbo-compressor and from here into the working cylinders 2 through the inlet ports 13 controlled by the pistons 4. If one of the pistons shown in Fig. 1 moves towards inner dead centre, the air in the cylinder concerned is so highly compressed that the fuel now injected into the cylinder burns with the result that expansion begins and the engine operates in known manner.

The exhaust valves 14 are opened before the piston 4 uncovers the inlet ports; the rising part of the cam 17 raises the tappet and the push rod 16 from which the movement is transmitted through the two-armed rocker 15 to the valve 14. At the end of the opening period, the valve 14 is closed by the spring 18.

Thus, by simple changing of the cam 17, it is easily possible to change the cross-sectional area of the valve 14 as desired without necessarily changing the timing of opening and closing of the inlet and exhaust ports.

By increasing the cross-sectional area of the exhaust valve 14, the resistance which burnt gases or the scavenge air meet in their passage out of the cylinder may be changed to suit the required rate of discharge of the turbo-compressor.

By the combination of the described multi-cylinder aggregate with the turbo-compressor the whole design of the engine is considerably simplified as compared with known arrangements and the cost of production is reduced.

The combination described serves only as a constructional example of the invention and the arrangement of the various parts may be modified at will within the scope of the invention.

Having now particularly described and ascertained the nature of my said invention and in what manner the same is to be performed, I declare that what I claim is:—

In a two-stroke radial Diesel engine of the type comprising a turbo-compressor driven by and coaxial with the crank shaft, a plurality of air cooled cylinders arranged in radial formation, a series of short inlet passages for the inlet of scavenging air completely encircling each of said cylinders circumferentially, a cover embracing each of the said series and forming a continuous annular channel about the said ports, each of said channels being directly connected to the circumferential discharge chamber of the turbo-compressor, exhaust valves in the heads of said cylinders, and means for adjusting the exhaust valves, said inlet passages being arranged to offer a minimum of frictional resistance to the air flow.

ANTONIN PODRABSKY.